Oct. 11, 1955        R. O. DAVIS        2,720,021

PILOT BEARING PULLER

Filed Dec. 19, 1951

INVENTOR.
Ralph O. Davis
BY
ATTORNEY

United States Patent Office 2,720,021
Patented Oct. 11, 1955

2,720,021

PILOT BEARING PULLER

Ralph O. Davis, Edwardsville, Kans.

Application December 19, 1951, Serial No. 262,436

1 Claim. (Cl. 29—265)

This invention relates to mechanic's tools and equipment and more particularly to a novel bearing puller, the primary object being to provide a device having cooperating bearing-engaging members shiftable relatively to facilitate and make possible the insertion thereof through the central opening of the bearing to be pulled.

It is the most important object of the present invention to provide a bearing puller that includes an elongated bolt or other screw-threaded device, having a pair of cooperating members thereon, one in threaded engagement with the bolt, and the other freely slidable thereon, the members having opposed bearing engaging ears.

A further object hereof is to provide a bearing puller including an elongated bolt provided with a pair of members, each including an L-shaped element presenting a shank and a bearing engaging ear, one of the elements having a nut thereon for engagement with the bolt and the other member having a collar on its shank slidable freely along the longitudinal axis of the bolt.

Other objects include details of construction, all of which will be made clear as the following specification progresses, reference being had to the accompanying drawing, wherein.

Figure 1:
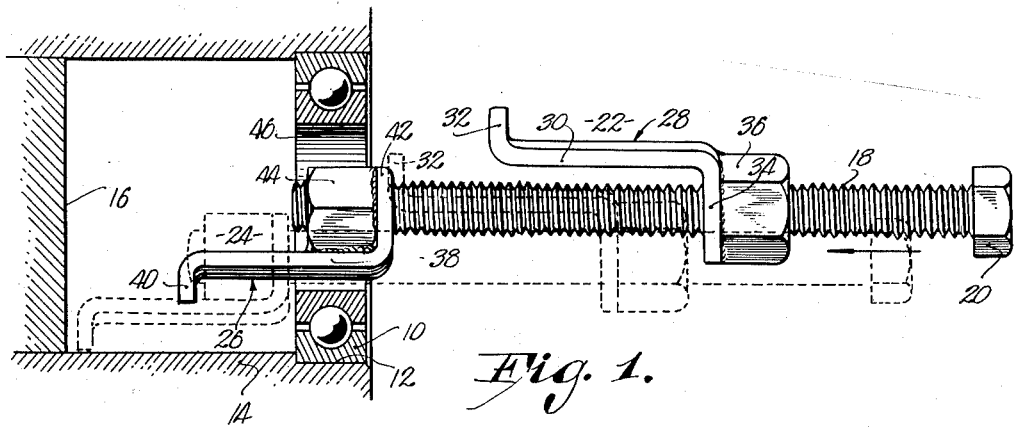
Figure 1 is a side elevational view of a pilot bearing puller showing the first step of operation thereof with respect to a bearing to be pulled.

Pilot bearings and the like of the kind illustrated and mounted in the manner shown by the drawing, are difficult to remove because of the inaccessibility to the innermost surface thereof. Such bearings 10 are normally disposed within a seat 12 formed in a support 14 and in opposed relationship to an engageable part 16.

The puller forming the subject matter of this invention includes an elongated device 18, that may constitute an ordinary bolt having external screw-threads preferably throughout the entire length thereof.

A head 20 having tool-engaging flats, is provided on the outermost end of the bolt 18. A pair of members, broadly designated by the numerals 22 and 24 respectively, are mounted on the bolt and have substantially Z-shaped elements 28 and 26 respectively. Element 28 is provided with an elongated shank 30 having an ear 32 at one end thereof and extending in one direction and a leg 34 at the opposite end thereof and extending in the opposite direction.

Figure 4:
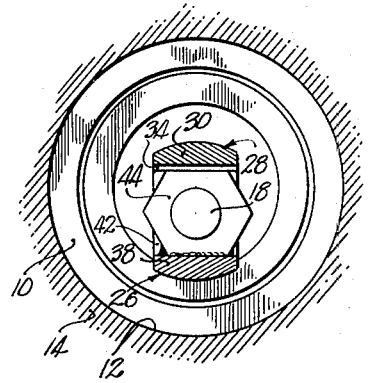
Fig. 4 is a cross-sectional view taken on line IV—IV of Fig. 2 looking in the direction of the arrows.
Figure 3:
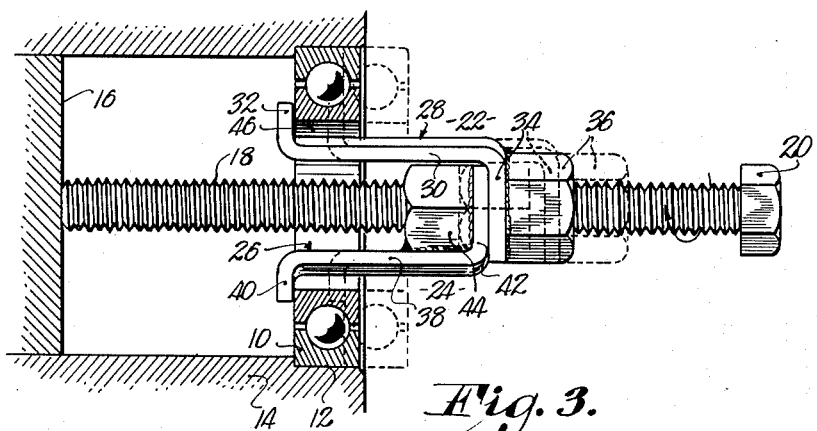
Fig. 3 is a view similar to Fig. 1 showing the puller in use.

Leg 34 is perforated to clear the bolt 18 and is welded or otherwise fixed directly to a collar 36 that surrounds the bolt 18 for free reciprocable movement longitudinally of the latter between head 20 and the member 24. The element 26 likewise has a shank 38, an ear 40 and a leg 42, the ears 32 and 40 therefore extending in opposite directions and the shanks 30 and 38 being in parallelism as shown in Figs. 3 and 4 of the drawing. The leg 42 of element 26 is welded or otherwise secured directly to a nut 44 that is internally tapped and in mesh with the screw threads of bolt 18. The distance between the outermost ends of the opposed ears 32 and 40 is greater than the diameter of opening 46 in bearing 10. Consequently, when the legs 34 and 42 of elements 28 and 26 respectively, are in face-to-face engaging relationship as shown in Fig. 3 of the drawing, it is impossible to insert the puller through the opening 46.

Figure 2:
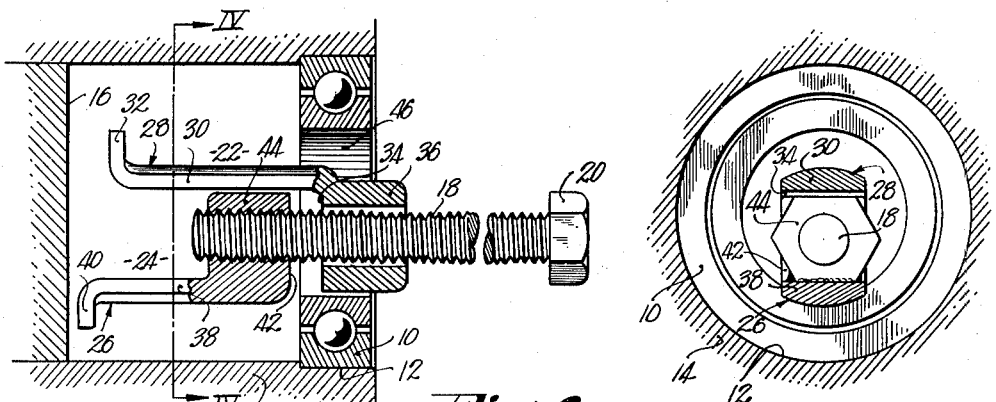
Fig. 2 is a view similar to Fig. 1 partially in section illustrating the second step of manipulation preparatory to placing the puller in use.

Accordingly, when the puller is to be placed in use, the member 22 is shifted toward the head 20 away from the member 24 in the manner illustrated by full lines in Fig. 1 of the drawing, and the member 24 is inserted to the position shown by full lines in Fig. 1, and thence to the position shown by dotted lines in Fig. 1 of the drawing. The operator thereupon, slides the member 22 toward the bearing 10, projects the element 28 including its ear 32, through the opening 46 until both ears 32 and 40 are between the bearing 10 and the engageable part 16 as illustrated in Fig. 2. The bolt 18 is thereupon rotated as indicated by the arrows in Fig. 3 of the drawing until that end thereof opposite to head 20, bears against the engageable part 16 with the ears 32 and 40 engaging the innermost surface of the bearing 10. Continued manipulation of the bolt 18 will shift both members 22 and 24 toward the head 20, away from the engageable part 16, carrying therewith the bearing 10 to the position indicated by dotted lines in Fig. 3 of the drawing, by virtue of the locking engagement of the ears 32 and 40 with the bearing 10.

Manifestly, details of construction may vary within the spirit of this invention and it is, therefore, desired to be limited only by the scope of the appended claim.

Having thus described my invention, what I claim as new and desire to secure by Letters Patent is:

A pulling tool for use in removing an annular bearing from a seated position within a chamber having a closed end spaced from the bearing and an open end opposite the closed end, said tool comprising only three essential elements in combination, said elements being an elongated bolt having a head on one end thereof adapted to be engaged by a wrench, an intermediate, threaded stretch, and a face on the other end thereof adapted to bear against the closed end of the chamber; a first, rigid, Z-shaped member having a leg threaded on said stretch of the bolt and provided with a surface facing toward the head of the bolt, an elongated shank extending from the leg toward said face of the bolt in spaced parallelism to the bolt, and an ear extending from the end of the shank remote from the leg in a direction radial to the bolt; and a second, rigid, Z-shaped member having a leg provided with a surface adapted to abut the surface of the first member and with a hole therethrough of larger dimensions than the diameter of said stretch of the bolt and of lesser dimension than said head of the bolt and said leg of the first member, an elongated shank of greater length than the shank of the first member extending from and substantially at a right angle to the leg of the second member, and an ear extending from and substantially at a right angle to the last-mentioned shank from the end thereof remote from the last-mentioned leg in a direction oppositely to said last-mentioned leg, a portion of said stretch of the bolt between the head of the bolt and the part of said stretch carrying the leg of the first member being passed through and loosely received by the hole in the leg of the second member with the surfaces of the members in opposed relationship, whereby the second member is rotatably, reciprocably and swingably carried on the bolt and is freely shiftable along the bolt from a tool inserting position spaced from the first member to a pulling position disposing the surfaces of the members in abutting relationship and their ears in oppositely extending relationship radially of the bolt and between the bearing and the closed end of the chamber.

References Cited in the file of this patent

UNITED STATES PATENTS

| | | |
|---|---|---|
| 1,504,650 | Smith | Aug. 12, 1924 |
| 1,544,246 | Leslie | June 30, 1925 |
| 2,031,998 | Bliss | Feb. 25, 1936 |
| 2,376,721 | Piper | May 22, 1945 |